April 19, 1960 H. C. GOODRICH 2,933,641

TRANSISTOR DEFLECTION CIRCUIT FOR TELEVISION RECEIVERS

Filed Jan. 2, 1958

INVENTOR.
HUNTER C. GOODRICH
BY
W. H. Sprague
ATTORNEY

United States Patent Office 2,933,641
Patented Apr. 19, 1960

2,933,641

TRANSISTOR DEFLECTION CIRCUIT FOR TELEVISION RECEIVERS

Hunter C. Goodrich, Collingswood, N.J., assignor to Radio Corporation of America, a corporation of Delaware Application January 2, 1958, Serial No. 706,794
8 Claims. (Cl. 315—27)

This invention relates to deflection circuits for television receivers and the like, and in particular to transistor deflection circuits for television kinescopes.

The deflection of the electron beam in a television kinescope can be achieved with deflection circuits employing transistors operating as bidirectional switching devices. In deflection circuits of this type, the transistor is alternately switched into a conducting and non-conducting condition by driving pulses having a repetition rate corresponding to the deflection scanning rate. During trace, the transistor is in the conductive, low impedance condition. During retrace, the transistor is in the cut-off, high impedance condition. To minimize transistor dissipation and increase the efficiency of such deflection circuits, the transistor should be cut-off by the applied pulses as rapidly as possible.

It is accordingly an object of the present invention to provide an improved transistorized deflection circuit for television receivers and the like.

In an embodiment of the invention, a resonant circuit is inductively coupled to the output electrode of the deflection transistor. An oscillatory voltage is reflected back to the transistor output electrode from the resonant circuit and results in an oscillatory current flow therein. By selection of the resonant frequency of the resonant circuit in accordance with the invention, a current minimum occurs at the instant of cut-off, thereby reducing both the transistor cut-off time and dissipation.

Figures 1, 2:
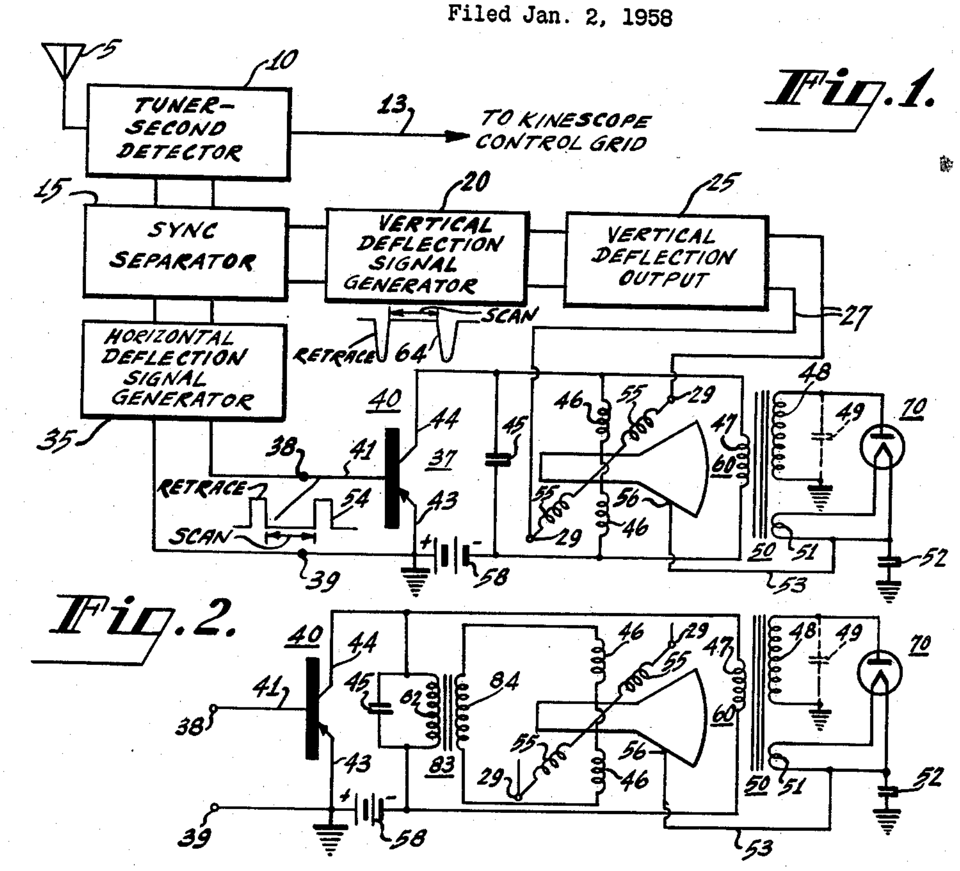
Figure 3:
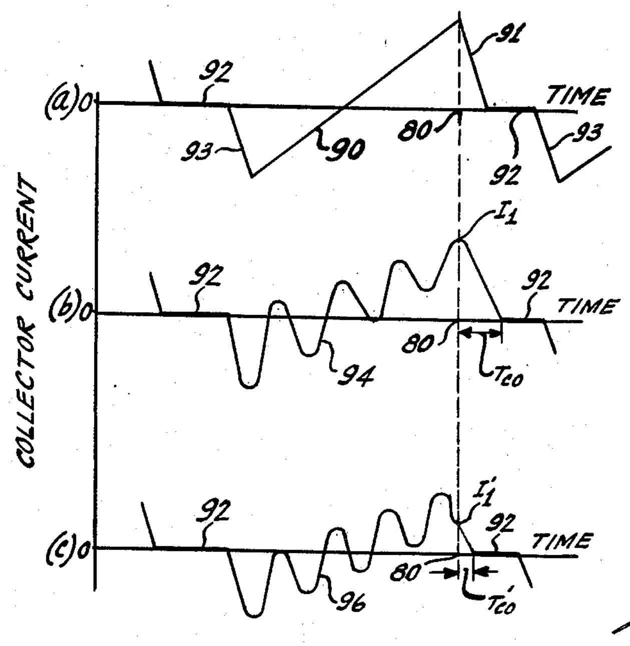

The novel features that are considered characteristic of this invention are set forth with particularly in the appended claims. The invention itself, however, both as to its organization and method of operation, as well as additional objects and advantages thereof, will best be understood from the following description when read in connection with the accompanying drawing, in which:

Figures 1 and 2 are schematic circuit diagrams of transistor horizontal deflection and high voltage power supply circuits for television receiving systems embodying the invention, the circuit of Figure 2 being a modification of the circuit of Figure 1; and Figures 3*a*, 3*b*, and 3*c* are graphs illustrating the collector current of a transistor in a circuit of the type shown in Figure 1 under certain operating conditions.

Referring now to Figure 1, a television receiver is arranged to receive composite television signals from an antenna 5, which is coupled to a suitable tuner and second detector 10. It is to be understood that the tuner and second detector 10 may be considered to include other conventional elements, such as a radio frequency amplifier, a converter for converting the radio frequency signals to intermediate frequency signals, an intermediate frequency amplifier, a detector for separating the video signals from the intermediate frequency carrier signals, and a video amplifier. The amplified video signal so developed is derived from an output lead 13, and applied to the control grid (not shown) of a picture tube or kinescope 60 for the receiver. The video signal is also applied to a sync separator circuit 15 connected with the tuner-second detector 10 as indicated. The sync separator circuit 15 is connected with and supplies vertical synchronizing pulses to a vertical deflection signal generator 20, which in turn, is connected to a vertical deflection output circuit 25. The vertical deflection output circuit is connected through a pair of leads 27 to the terminals 29 of a vertical deflection winding 55 of the kinescope 60.

Horizontal synchronizing pulses are derived from the sync separator 15 and are applied to the horizontal deflection signal generator 35 which is connected with the sync separator 15 as indicated. The horizontal deflection signal generator provides a train of voltage pulses indicated at 54, for driving the horizontal output transistor 40. The voltage pulses 54 occur at the horizontal scanning rate of 15,750 pulses per second, for example. The horizontal deflection signal generator 35 would, as is conventional, normally include circuitry for maintaining the sawtooth deflection current in proper phase with the horizontal sync signals. The horizontal deflection signal generator is connected with a transistor deflection circuit 37 through input terminals 38 and 39. In the circuit 37, the horizontal oscillator pulses 54 are applied between the base 41 and the emitter 43 of a deflection transistor 40 which in the present example, is the horizontal output transistor and may be considered to be of the P-N-P junction type. In addition to the emitter electrode 43 and the base electrode 41, the transistor is provided with the usual collector electrode 44. It should be noted in the description that follows that if a transistor of P-type conductivity were used, as an N-P-N junction transistor, for example, the polarity of biasing supply elements and of the cut-off or retrace pulses 54 would be reversed. The emitter 43 of the output transistor 40 is connected directly to the chassis of the television receiver which is at a point of reference potential or ground.

The output circuit for the horizontal output transistor 40 includes the deflection windings 46 connected in series between the collector 44 and the grounded emitter 43 through a source of operating or biasing potential 58. Deflection current, of sawtooth waveform, flowing through the windings 46 controls the horizontal displacement of the electron beam of the kinescope 60 in response to the pulses 54 applied to the deflection transistor 40. A tuning capacitor 45 is connected in parallel with the horizontal deflecting coils, and the combination of the inductance of windings 46, the capacitance of the capacitor 45 and additional reactance reflected through the high voltage supply circuit hereinafter described, is made to resonate at the retrace frequency.

The positive terminal of the potential source 58 is connected to the chassis ground and the emitter while the negative terminal is connected through the horizontal deflection coils 46 to the collector 44. The source 58 may have a value of 10 volts, for example.

A high voltage step-up transformer 50, for the kinescope high voltage supply circuit is provided with a primary winding 47 connected in parallel with the horizontal deflection coils 46. The secondary winding 48 of the transformer is tuned and inductively coupled back to the transistor 40, so that in accordance with the invention, the collector current becomes minimum at the start of the retrace interval. This provides fast retrace time, decreases dissipation, and increases efficiency as will be explained hereinafter.

It should be noted that an autotransformer may be used in place of the high voltage transformer 50 without changing the operating characteristics of the circuit.

The secondary winding 48 may be tuned by a shunt capacitor 49 to the required frequency. The capacitor 49 may be the transformer distributed capacitance, and accordingly is shown connected by dotted lines in Figures 1 and 2. By utilizing this distributed capacitance the need for connecting a physical capacitor element in parallel with the secondary of the transformer 50 in most cases can be eliminated. One terminal of the secondary winding 48 is grounded and the other terminal is connected to the plate electrode of a high voltage rectifier such as a vacuum tube diode 70. The turns ratio of the transformer 50 may be considered to be of the order of 100-to-1 from secondary to primary in the present example. An additional secondary winding 51 is provided on the transformer 50 for supplying heater power to the high voltage rectifier 70. One terminal of the secondary winding 51 of transformer 50 is connected through a high voltage supply lead 53 to the ultor connection 56 of kinescope 60 for applying the high voltage thereto. In addition, a high voltage filter capacitor 52 is connected from the secondary winding 51 to ground for the system, as indicated.

In operation, a television signal received through the antenna 5, is amplified and demodulated in the television receiver element 10 which, as noted, includes the usual radio frequency amplifier, converter, intermediate frequency amplifier, detector and video amplifier. The video signal appearing at the output lead 13 is then applied to the control grid (not shown) of the kinescope 60. Video signals are also applied to the sync separator circuit 15, which supplies vertical synchronizing signals to the vertical deflection signal generator 20 and horizontal synchronizing pulses to the horizontal deflection signal generator 35. Output pulses generated by the vertical deflection generator 20 are supplied to the vertical deflection output circuit 25 which, in turn, supplies a suitable sawtooth current of field frequency through the vertical deflection winding 55.

Horizontal output pulses, indicated at 54, are applied between the base 41 and emitter 43 of the horizontal output transistor 40 during the retrace portion of the deflection cycle. These pulses are of a positive polarity for the P-N-P transistor shown. During the interval between the pulses 54 the transistor 40 is biased for forward conduction and is at saturation. Maximum current thus flows in the collector-emitter circuit in the direction of the emitter arrow and current flow through the horizontal deflection coils 46 increases in a linear manner. This corresponds to the scan or trace portion of the deflection cycle.

The application of a positive pulse 54 between the emitter and base electrodes of the horizontal output transistor 40 cuts off the transistor 40 during the retrace interval or portion of the horizontal deflection cycle. The horizontal output transistor 40 therefore operates like a switch and has low collector-emitter resistance when saturated and a very high collector-emitter resistance when cut-off. The emitter-collector load circuit of the transistor 40 is opened upon application of each of the positive pulses 54, discharging the energy stored in the horizontal deflection coils 46 through the capacitor 45, and the reflected capacitance of the capacitor 49. As noted, this portion of the cycle corresponds to the retrace portion of the horizontal deflection cycle.

Negative going voltage pulses, indicated at 64, are developed across the output circuit of the transistor 40 during this retrace portion of the deflection cycle as the resonant circuit composed of the horizontal deflection coils 46, the capacitor 45 and the reflected capacitance of capacitor 49, goes through a period of oscillation, and current flow reverses in the transistor 40. The voltage pulses indicated at 64 are in the form of one-half of a sine wave cycle, and are relatively large in amplitude.

To develop high voltage for the kinescope 60, the pulses 64 are applied to the primary winding 47 of the high voltage transformer 50. The voltage developed across the secondary winding 48 is rectified by the vacuum tube diode 70 and charges the capacitor 52 to supply a corresponding high direct voltage for the ultor connection 56 on the kinescope 60.

The distributed capacitance 49 of the secondary winding 48 of the high voltage transformer 50 forms a resonant circuit with the secondary winding 48. During the scan or trace portion of the deflection cycle, this resonant circuit reflects back to the primary winding 47 an induced damped oscillatory voltage. This oscillatory voltage, in turn, produces oscillations on the normally linearly increasing portion of the collector current waveform. The deflection transistor current waveforms shown in Figure 3 may now be considered in connection with the circuit of Figure 1, for a further understanding of the operation of the invention.

The typical deflection waveform of Figure 3*a* consists of a linear bam scan 90 and beam retrace occurring during the time indicated by the curves 91, 92 and 93. The curve 91 represents the cut-off current of the transistor while operating in the normal direction and the curve 93 represents the build-up of current in the transistor when operating in the reverse direction. Since the deflection transistor acts as a bidirectional switch, the term "normal operation" is used herein to define well known transistor operation in which conventional current flows in the direction of the emitter arrow in the schematic circuit diagram. The term "reverse direction" is used to indicate that the collector assumes the role of the emitter and the transistor conducts in the reverse direction. A transition interval, represented by each of the curves 92, occurs between the conduction states.

The curve 94 of Figure 3*b* shows the damped oscillations appearing in the collector current waveform of a circuit wherein dissipation is undesirably high and the retrace time is slow. In curve 94 the oscillations are of such frequency that the collector current is at the peak of the oscillatory cycle just prior to the time the cut-off or retrace pulse is applied to the transistor. The transistor cut-off process occurs at the beginning of retrace and is designated $T_{co}$ in Figure 3*b*, with the collector current just prior to cut-off designated $I_1$.

It has been shown and experimentally verified that, in a horizontal deflection transistor, the power dissipation varies as the third power of the collector current just prior to cut-off and this is the only appreciable power dissipated in the transistor. Therefore, the collector dissipation will be a maximum in a transistor horizontal deflection circuit operating in a manner shown in Figure 3*b*. By reducing $I_1$ the transistor dissipation would be greatly reduced and in addition the retrace time would also be reduced.

In accordance with the invention, the frequency of the reflected oscillation is adjusted so that the collector current in the deflection transistor 40 is a minimum just prior to the application of each cut-off pulse 54 between the base and emitter electrodes of this transistor, as shown in Figure 3*c*. Under some conditions of operation there may be a delay or storage interval between the time the cut-off pulse is applied and the time the collector-to-emitter impedance begins to rise. In this case compensation is made for this delay so that the current minimum occurs just prior to the actual rise in collector-to-emitter impedance which signifies cut-off. The resonant frequency may be adjusted by controlling the secondary inductance, the distributed capacitance 49, and the coupling between the primary winding 47 and the secondary winding 48 of the transformer 50.

Referring now to the curve 96 of Figure 3*c*, the improvement in performance obtained by tuning the secondary 48 of the high voltage transformer 50 can be seen. The cut-off pulse 54 is applied at the instant designated 80 on the time axis. The collector current in the deflection transistor 40, when the secondary winding 47 is tuned, is designated $I_1$, and is considerably less than the current $I_1$ shown in Figure 3*b*, wherein deliberate tuning is not used.

As an illustration of the effectiveness of the improvement provided by the invention, the circuit shown in Figure 1 was adjusted so that just prior to cut-off a current midway between $I_1$ and $I_1'$ flowed in the collector of the deflection transistor. By deliberate tuning of the secondary winding of the high voltage transformer, this current level was reduced an additional 30%. Since the collector dissipation varies as the third power of the collector current level just prior to cut-off, the dissipation was therefore reduced to 34% of the original dissipation. This represents a very substantial improvement in the efficiency of operation of the horizontal deflection circuit.

It has been experimentally observed that the improved performance, as represented by the curves shown in Figure 3*c* for example, is achieved when the resonant frequency is made such that the number of cycles of reflected oscillation occurring in the forward scan time is equal to an integral number plus a fraction of a cycle. This fraction has been observed in operation of the circuit to be one-half cycle. However, the resonant frequency also affects the retrace time, and, accordingly, values such as four and one-half or five and one-half cycles may be acceptable. Under present standards, the forward scan time may be 53.4 microseconds for example. A resonant frequency of 86 kilocycles is required for four and one-half cycles of reflected oscillation to occur during the 53.4 microsecond scan time. For the condition of five and one-half cycles of reflected oscillation, a resonant frequency of 103 kilocycles is required.

The oscillations in the scan portion of the deflection cycles, represented by the curves 94 and 96, for example, do not appear in the horizontal deflection coils 46, because during scan time the transistor 40 exhibits a very low saturation resistance and thus maintains a constant voltage across the deflection coils.

The faster cut-off time provided by a circuit embodying the invention can also be observed in Figure 3*c*, and is due to the fact that the oscillations in the collector current waveform just prior to cut-off alter the collector current in the same direction as would occur upon application of the retrace pulse 54. The retrace time in a circuit modified in accordance with the invention is shown as $T_{co}'$ in Figure 3*c*, and a comparison with the cut-off time $T_{co}$ of the conventional circuit illustrated in Fig. 3*b* indicates the improvement obtained.

In the modification of the above described horizontal deflection circuit as shown in Figure 2, to which attention is now directed, it will be noted that a transformer 83, having a primary winding 82 and a secondary winding 84, is used to inductively couple the horizontal deflection coils 46 to the collector or output circuit of the transistor 40 rather than the direct coupling of the circuit of Figure 1. One terminal of the primary winding is connected to the collector 44 of the transistor 40 and the other terminal is connected to the negative electrode of the bias voltage supply 58. The serially-connected horizontal deflection windings 46 are connected with the terminals of the secondary winding. The primary winding 47 of the high voltage transformer 50 is thus, in this modification, connected in parallel with the primary winding of the transformer 80. By this means the inductance seen from the collector terminal of the deflection transistor may be modified by the turns ratio of the transformer 83. A typical value for the inductance reflected to the collector 44 may be 70 microhenries. In addition, in this circuit, the capacitor 45 is connected in parallel with the primary winding 82 of the transformer 83 and is selected to resonate with the total inductance and reflected capacitance to produce the desired retrace interval. Assuming a retrace time of 10 microseconds in accordance with accepted standards, the retrace frequency is then on the order of 100 kilocycles. Otherwise the construction and operation of the transistor deflection circuit of Figure 2 is the same as that of Figure 1.

In a system wherein ultor or high voltage is not to be taken from the horizontal deflection stage, it may still be advantageous to make use of the principles heretofore described. Accordingly, a transformer having an untuned primary winding and a tuned secondary winding as described, that is, with the secondary winding tuned to the desired resonance frequency by means of either distributed or fixed capacitance may operate to provide a reflected oscillatory voltage without the high voltage vacuum tube diode 70.

Transistorized horizontal deflection circuits embodying the invention provide decreased dissipation, high efficiency, and fast retrace time. This can be accomplished, moreover, without using additional components in the deflection circuit, thus providing improved performance with circuits which are relatively economical to construct.

What is claimed is:

1. In a television receiver, the combination with an electron beam image reproducing device having a horizontal deflection winding, of a horizontal deflection and a high voltage power supply circuit comprising, a transistor including base, emitter and collector electrodes, means for applying biasing potentials to said transistor, a horizontal output transformer having a primary winding connected with the collector electrode of said transistor and a secondary winding connected with said deflection winding for supplying deflection current thereto during the trace portion of each horizontal deflection cycle, means for applying horizontal deflection signals to said transistor to reduce deflection current flow thereof during the retrace portion of each horizontal deflection cycle, a high voltage transformer having a primary winding and a secondary winding, said primary windings being connected in parallel, and means for tuning the secondary winding of said high-voltage transformer to provide an oscillatory voltage on the collector of said transistor through said high voltage transformer of a frequency to minimize the collector current flow of said transistor at the start of said retrace portion of each horizontal deflection cycle.

2. In a television receiver, a kinescope horizontal deflection circuit comprising in combination; a transistor including base, emitter, and collector electrodes, said emitter electrode being connected to ground for said receiver; input circuit means connected for applying signal energy between said base and emitter electrodes during the retrace portion of the deflection cycle; biasing potential supply means for said transistor; circuit means for connection with a kinescope deflection winding, said biasing potential supply means and said circuit means being serially connected between said emitter and collector electrodes, and a tuned transformer having a primary winding connected in parallel with said circuit means and a secondary winding tuned to provide a number of cycles of reflected oscillations in the collector current of said transistor during the scan portion of the deflection cycle effective to minimize said collector current at the start of said retrace portion of the deflection cycle and equal to an integral number plus a fraction.

3. A deflection circuit as defined in claim 2, in which the secondary winding of the transformer is tuned to 86 kilocycles to provide 4½ cycles of reflected oscillations during the normal scan time.

4. A deflection circuit as defined in claim 2, in which the secondary winding of the transformer is tuned to 103 kilocycles to provide 5½ cycles of reflected oscillations during the normal scan time.

5. A horizontal output circuit for supplying deflection current to the deflection winding of a television kinescope, comprising, in combination, a transistor including base, emitter, and collector electrodes, means including a kinescope deflection winding connected in circuit with said emitter and collector electrodes providing an output signal path therebetween, a tuned transformer having a primary and a secondary winding, means connecting said primary winding in parallel with said deflection winding, said secondary winding being tuned to provide an integral number plus one-half cycle of reflected oscillations in the collector current of said transistor during the scan portion of each deflection cycle, means connected for biasing said transistor for maximum conduction during the trace portion of each deflection cycle, means connecting the emitter electrode to ground for the circuit, and means connected for applying signal energy between said base and emitter electrodes during the retrace portion of said deflection cycle of a polarity and amplitude substantially to cut-off said transistor.

6. A horizontal output circuit for supplying deflection current to the deflection winding of a television kinescope comprising, in combination, a transistor including base, emitter, and collector electrodes, an output transformer including a primary winding and a secondary winding, means for connecting the secondary winding of said output transformer with a kinescope deflection winding, biasing potential supply means for said transistor, means connecting said primary winding and said biasing potential supply means between said collector electrode and ground for said circuit, said biasing potential supply means being poled in said circuit to bias said transistor for maximum conduction during the trace portion of the horizontal deflection cycle, means connecting said emitter electrode directly to said chassis ground, input circuit means for applying signal energy to the base electrode of said transistor of a polarity and amplitude substantially to cut-off said transistor during the retrace portion of said deflection cycle, and means for reducing the collector current of said transistor to a minimum value at the start of said retrace portion of the deflection cycle including a tuned transformer having a primary winding connected in parallel with the primary of said output transformer and a secondary winding tuned to provide oscillations on the primary winding of said tuned transformer of a polarity and frequency to minimize current flow of said transistor at the start of said retrace portion of the horizontal deflection cycle.

7. In a television receiver, the combination with a kinescope having a horizontal deflection winding, of a horizontal deflection and high voltage power supply circuit comprising, a transistor connected and biased for operation at saturation and in a low resistance condition during the trace portion of the horizontal deflection cycle of said receiver, means for applying input pulses to said transistor for operating said transistor in a relatively high resistance and substantially non-conducting condition during the retrace portion of the input cycle, means providing a direct-current conductive connection for said transistor with said deflection winding for supplying deflection current thereto during the trace portion of the deflection cycle, a high voltage power supply transformer having a primary winding connected in parallel with said deflection winding and being thereby connected in circuit with the transistor, said transformer having a secondary winding coupled to said transistor through the primary winding and tuned to minimize the collector current of said transistor at the start of the retrace cycle, and means connecting said secondary winding with said kinescope for applying high operating voltages thereto.

8. In a television receiver, a deflection circuit for an image reproducing device having a deflection winding, comprising, in combination, a transistor, means for applying signal energy to said transistor to reduce current flow thereof during the retrace portion of the deflection cycle, a resonant circuit coupled to the output electrode of said transistor, and means for tuning said resonant circuit to provide an oscillatory voltage on the output of said electrode of a frequency to minimize the output current of said transistor at the start of said retrace portion of the deflection cycle.

References Cited in the file of this patent

UNITED STATES PATENTS

| | | |
|---|---|---|
| 2,747,136 | Herzog | May 22, 1956 |
| 2,814,736 | Hamilton | Nov. 26, 1957 |

FOREIGN PATENTS

| | | |
|---|---|---|
| 1,140,766 | France | Mar. 4, 1957 |

OTHER REFERENCES

Herzog et al.: "Transistorized Portable Receiver," Radio-Electronics, January 1955, pages 43 to 45.

Guggi: "CRT Deflection Circuit Has High Efficiency," Electronics, April 1, 1957, pages 172 to 175.